(12) United States Patent
Hamasaki et al.

(10) Patent No.: US 7,184,228 B2
(45) Date of Patent: Feb. 27, 2007

(54) LENS BODY TUBE

(75) Inventors: Takuji Hamasaki, Saitama-ken (JP);
Tomoaki Kobayashi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 94 days.

(21) Appl. No.: 11/272,894

(22) Filed: Nov. 15, 2005

(65) Prior Publication Data

US 2006/0103954 A1 May 18, 2006

(30) Foreign Application Priority Data

Nov. 16, 2004 (JP) .............................. 2004-331351

(51) Int. Cl.
*G02B 7/02* (2006.01)
(52) U.S. Cl. .................. 359/825; 359/819; 359/830
(58) Field of Classification Search ................ 359/819, 359/825, 821, 822, 823, 826
See application file for complete search history.

(56) References Cited

U.S. PATENT DOCUMENTS 5,410,432 A * 4/1995 Kobayashi ................. 359/740

* cited by examiner

*Primary Examiner*—Timothy Thompson
*Assistant Examiner*—Jerry Fang
(74) *Attorney, Agent, or Firm*—Greenblum & Bernstein, P.L.C.

(57) ABSTRACT

A lens body tube includes a main tube, at least one lens configured movable along the optical axis direction of the lens body tube in the main tube, a first ring configured to be rotated for a zooming operation, the first ring being disposed around the outer circumference of the main tube, a second ring configured to be rotated for a focusing operation, the second ring being disposed around the outer circumference of the main tube, a third ring configured to be rotated by the first ring, the third ring being disposed inside the main tube, a fourth ring configured to be translated along the optical axis direction by rotation of the third ring, the fourth ring being disposed inside the main tube, a fifth ring configured to be rotated by the second ring, and at least one lens frame, of the at least one lens, supported by the fifth ring. The fifth ring is screwed together with the fourth ring.

18 Claims, 6 Drawing Sheets

LENS BODY TUBE

BACKGROUND OF THE INVENTION

The present invention relates to a lens body tube having a zooming and focusing functions, and more particularly to a lens body tube appropriately applicable to a for-element focusing mechanism.

A for-element focusing type lens body tube, in which a front lens group moves for a zooming or focusing operation, is designed such that the front lens group is not caused to rotate around the optical axis, to keep accessories attached to a lens frame such as a filter and a hood from rotating around the optical axis. For example, Japanese Unexamined Patent Publication No. HEI11-84203 proposes a structure that inhibits the lenses inside the lens body tube including the front lens group from rotating around the optical axis when performing the zooming, but that allows the lenses to move along the optical axis maintaining the angular position around the optical axis, when performing the focusing. However, the technique disclosed in Japanese Unexamined Patent Publication No. HEI11-84203 does not allow the front lens group alone to move along the optical axis when performing the focusing, and besides, fails to specifically describe a structure of a plurality of rings included in the lens body tube.

Figure 6:
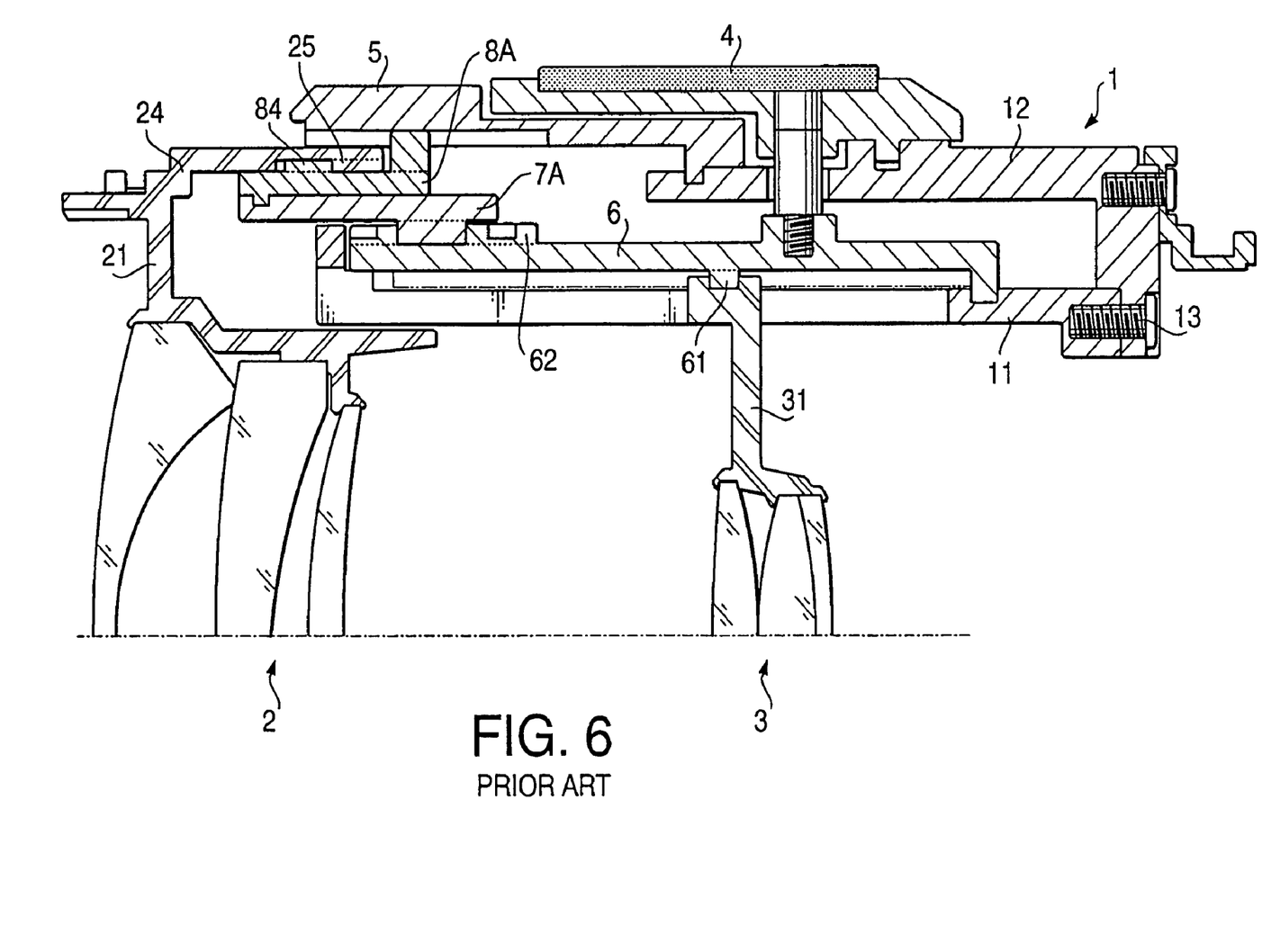
FIG. 6 is a cross-sectional view showing an upper half of a conventional lens body tube with respect to the optical axis.

FIG. 6 shows an example of a conventional for-element focusing type lens body tube. This lens body tube includes a main tube 1 composed of an inner tube 11 and an outer tube 12 combined with screws 13, and the inner tube 11 accommodates a plurality of lenses, in this case, two lens groups of a front lens group 2 and a rear lens group 3, installed movably along the optical axis. On the outer circumference of the outer tube 12, a zoom ring 4 and a focus ring 5 are rotatably mounted around the optical axis, and also a cam ring 6 is mounted on the outer circumference of the inner tube so as to rotate around the optical axis, interlocked with the zoom ring 4. Hereinafter, the term related to "rotation" is to be construed as describing the rotation around the optical axis. A lens frame 31 of the rear lens group 3 is engaged with an inner cam 61 of the cam ring 6, so that rotation of the cam ring 6 causes the rear lens group 3 to move along the optical axis. To the outer circumference of the cam ring 6, a moving ring 7A which is engaged with an outer cam projection 62 of the cam ring 6 is fitted, so as to move in the optical axis direction with the rotation of the cam ring 6, and also a helicoid ring 8A is fitted to the outer circumference of the moving ring 7A, so as to move together with the moving ring 7A in the optical axis direction when the focus ring 5 is rotated. The helicoid ring 8A is provided with a male helicoid (spiral groove) 84 on an outer circumferential surface thereof. Further, a sleeve portion 24, provided in the optical axis direction around the outer circumference of a lens frame 21 of the front lens group 2, overlaps the outer circumference of the helicoid ring 8A, such that a female helicoid 25 formed on an inner surface of the sleeve portion 24 is screwed together with the male helicoid 84 of the helicoid ring 8A. The lens frame 21 of the front lens group 2 is fitted to a key groove (not shown) provided in the optical axis direction on the inner surface of the inner tube, and is hence kept from rotating inside the inner tube.

In the conventional lens body tube thus configured, rotating the zoom ring 4 causes the cam ring 6 to rotate, so that the inner cam 61 of the cam ring 6 causes the rear lens group 3 to move along the optical axis, in a zooming operation. Here, the outer cam 62 also causes the moving ring 7A, and hence the helicoid ring 8A to move in the optical axis direction, which in turn causes the front lens group 2, which is screwed together with the helicoid ring 8A via the sleeve portion 24, to move along the optical axis. Such operation allows the front lens group 2 and the rear lens group 3 to simultaneously move over a predetermined distance along the optical axis, thus completing the zooming action. Likewise, in a focusing operation, rotating the focus ring 5 causes the helicoid ring 8A to interlockedly rotate. At this moment, the moving ring 7A is kept from being rotated because of the key structure (not shown) provided in the optical axis direction, and from moving in the optical axis direction because of being engaged with the outer cam projection 62 of the cam ring 6. Thus the rotation of the helicoid ring 8A causes the sleeve portion 24 of the lens frame 21 screwed together with the helicoid ring 8A, and hence the front lens group 2 to move along the optical axis, thereby achieving the desired focusing effect. In either of the zooming and focusing operation, the front lens group 2 is kept from being rotated because of the key structure via which the front lens group 2 is engaged with the inner tube 11. Consequently, when accessories such as a filter and a hood (not shown) are attached to the lens frame 2 of the front lens group 2, those accessories are kept from rotating during the zooming or focusing operation.

In the lens body tube shown in FIG. 6, the front lens group 2 has to be moved along the optical axis independently in the zooming and focusing operations. To achieve this, the moving ring 7A is interposed between the helicoid ring 8A interlocked with the focus ring 5 and the cam ring 6 interlocked with the zoom ring 4, to thereby eliminate interference between the helicoid ring 8A and the cam ring 6 when rotating. In other words, the moving ring 7A does not have to be rotated by the rotational movement of the helicoid ring 8A in the focusing operation, and yet has to transmit the movement in the optical axis direction caused by the cam ring 6 to the helicoid ring 8A, in the zooming operation. Besides, for achieving the helicoidal engagement between the helicoid ring 8A and the lens frame 21 of the front lens group 2 via the sleeve portion 24, the associated components have to be radially stacked. More specifically, the three ring-shaped components, namely the moving ring 7A, the helicoid ring 8A and the sleeve portion 24 of the front lens group 2, have to be radially stacked on the outer circumference of the cam ring 6, which naturally leads to an increase in diameter in this portion and thus constituting a bottleneck in making the lens body tube smaller in diameter.

SUMMARY OF THE INVENTION

The present invention is advantageous in that a for-element focusing type lens body tube, which is provided with a reduced number of radially stacked ring-shaped components to achieve a reduction in diameter, is provided.

According to an aspect of the invention, there is provided a lens body tube, which is provided with a main tube, at least one lens configured movable along the optical axis direction of the lens body tube in the main tube, a first ring configured to be rotated for a zooming operation, the first ring being disposed around the outer circumference of the main tube, a second ring configured to be rotated for a focusing operation, the second ring being disposed around the outer circumference of the main tube, a third ring configured to be rotated by the first ring, the third ring being disposed inside the main tube, a fourth ring configured to be translated along the optical axis direction by rotation of the cam ring, the fourth ring being disposed inside the main tube, a fifth ring configured to be rotated by the second ring; and at least one lens frame, of the at least one lens, supported by the fifth ring. In this case, the fifth ring is screwed together with the fourth ring.

Optionally, the main tube may include an inner tube and an outer tube, the third ring being disposed around the outer circumference of the inner tube. Optionally, the first ring and the second ring may be disposed around the outer circumference of the outer tube. Optionally, the fourth ring and the fifth ring may be radially stacked between the second and third rings.

Optionally, the at least one lens may be restricted from rotating around the optical axis.

Still optionally, the lens body tube may further include a plurality of lenses, the at least one lens being included in a front lens group, in the optical axis direction, among the plurality of lenses.

Further optionally, the third ring may be formed with at least one outer cam on the outer circumferential surface thereof. Optionally, the fourth ring may be engaged with the at least one outer cam.

Optionally, the at least one lens frame and the fifth ring are configured engaged with each other through a bayonet mechanism, so as to relatively rotate with respect to each other, but to be mutually interlocked in the optical axis direction.

DETAILED DESCRIPTION OF THE EMBODIMENTS

A lens body tube according to the present invention includes a cam ring disposed around the outer circumference of an inner tube of a main tube, a zoom ring and a focus ring disposed around the outer circumference of an outer tube of the main tube, and a moving ring and a helicoid ring radially stacked between the cam ring and the focus ring. Such structure permits reducing the radial distance between the cam ring and the focus ring, thus reducing the diameter of the lens body tube. Also, applying the present invention to a lens restricted from rotating around the optical axis, especially to a front lens cell, allows performing the zooming and focusing operation without causing the front lens cell, and hence accessories attached to the front lens cell, to rotate.

Figure 1:
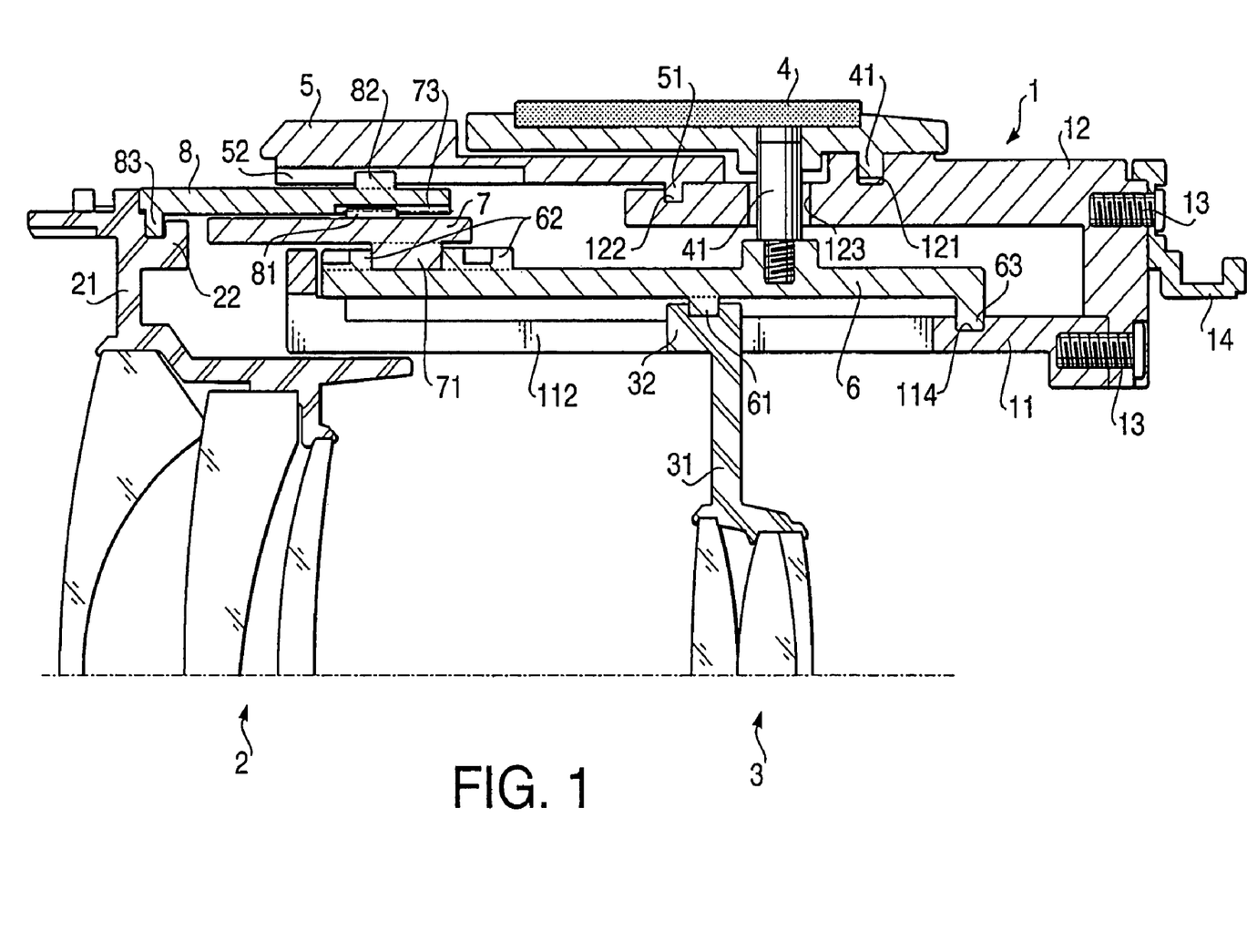
FIG. 1 is a cross-sectional view showing an upper half of a lens body tube with respect to the optical axis, according to an embodiment of the present invention.
Figure 2:
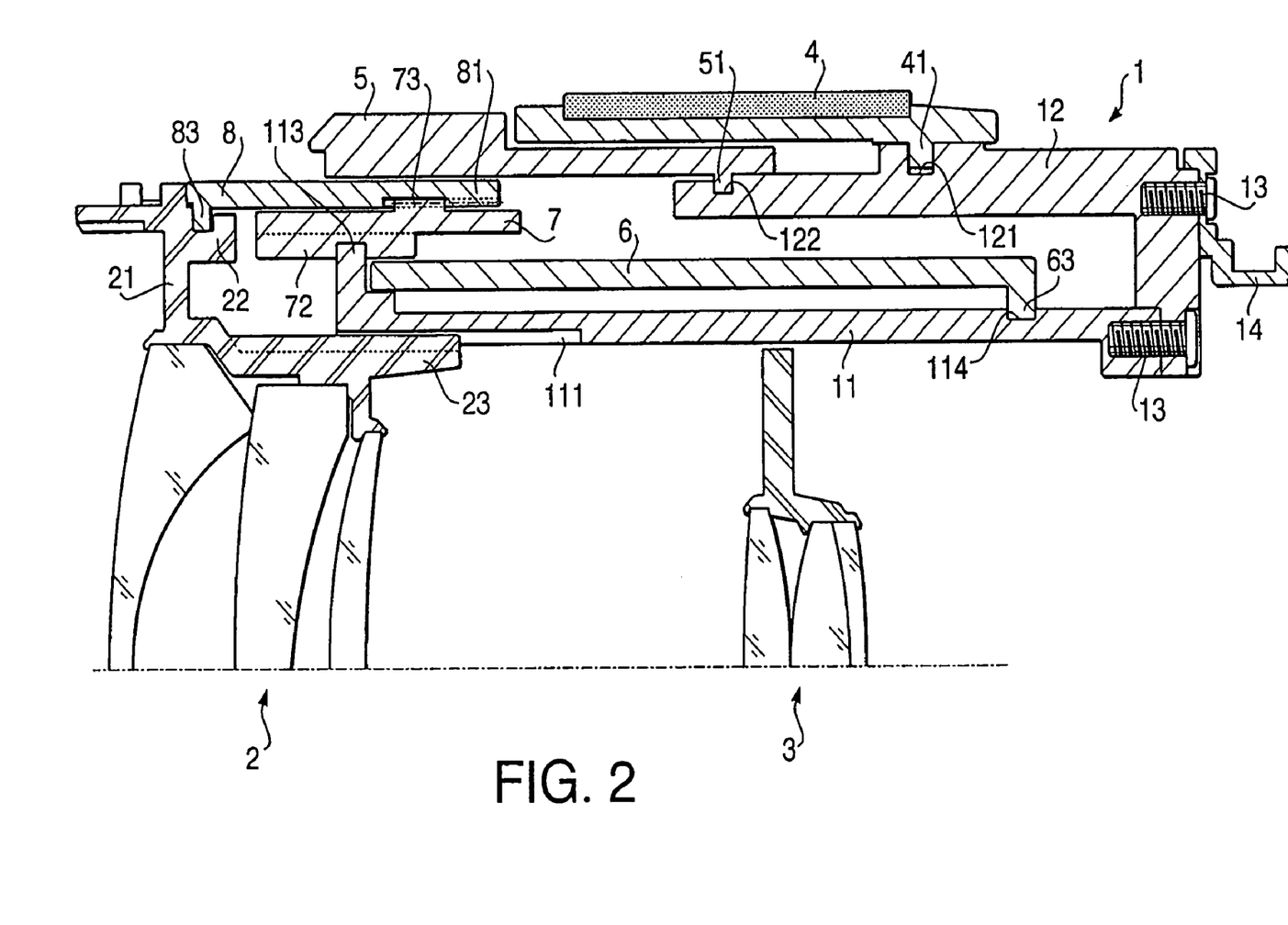
FIG. 2 is a cross-sectional view of the same lens body tube, taken along a different plane.
Figure 3:
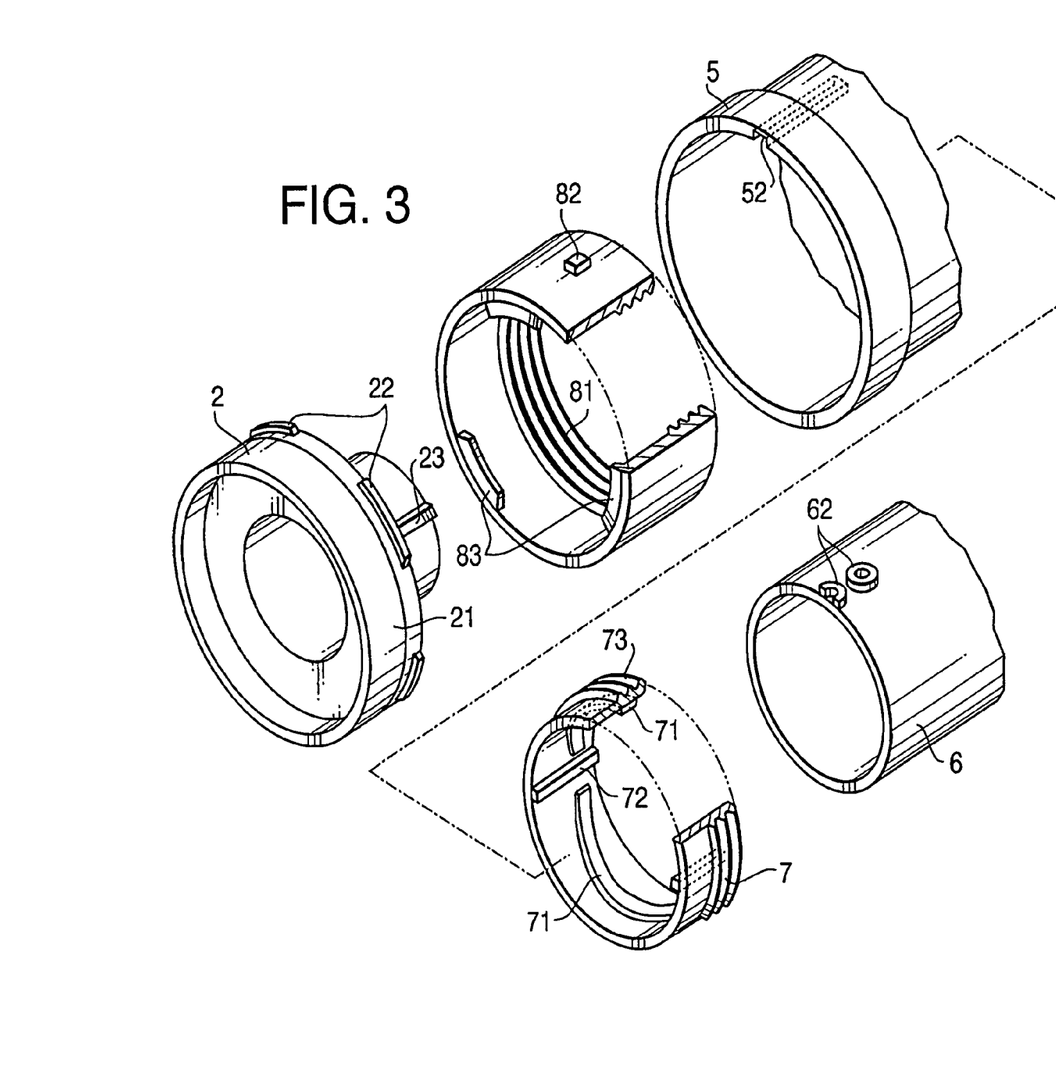
FIG. 3 is an exploded perspective view showing a portion of the lens body tube.

Hereinafter, an embodiment of the present invention will be described referring to the accompanying drawings. FIG. 1 is a cross-sectional view showing an upper half of a lens body tube according to the present invention, since the lens body tube is symmetric with respect to the optical axis. FIG. 2 is a cross-sectional view of the same lens body tube taken along a different plane, and FIG. 3 is an exploded perspective view showing components constituting the principal portion of the lens body tube. In these drawings, an inner tube 11, smaller in diameter, which serves to guide a lens to be subsequently described when moving rectilinearly along the optical axis direction, and an outer tube 12 larger in diameter are joined at the respective rear end portions with screws 13, thus to constitute a main tube 1. The screws 13 also serve to fix to the main tube a lens bayonet portion 14, via which the lens body tube is engaged with a lens mount of a camera body (not shown). The inner tube 11 accommodates a front lens group 2 and a rear lens group 3, movably installed along the optical axis direction. The inner tube 11 is provided with a key groove 111 formed on a region of the inner circumferential surface thereof, in the optical axis direction, so that a key portion 23 formed so as to protrude from a region on the outer circumferential surface of a lens frame 21 of the front lens group 2 gets engaged with the key groove, thus to restrict the front lens group 2 from rotating around the optical axis, while permitting a movement thereof along the optical axis direction.

On the outer circumference of the outer tube 12, a zoom ring 4 and a focus ring 5 are mounted side by side in the optical axis direction, for a rotational operation around the optical axis. In this embodiment, projections 41, 51 provided on an inner circumferential surface of the respective rings 4, 5 are engaged with ring grooves 121, 122 provided on the outer circumferential surface of the outer tube 12, so that the projections 41, 51 can rotationally move along the ring grooves 121, 122, respectively, thus to allow the rotation of the zoom ring 4 and the focus ring 5.

The inner tube 11 also rotatably supports a cam ring 6 around the outer circumference thereof. To be more detailed, the cam ring 6 is provided with a bayonet piece 63 radially and inwardly projecting from a rear end portion, which is engaged with a bayonet groove 114 provided at a corresponding position on the inner tube 11, so that the cam ring 6 can freely rotate with respect to the inner tube 11 but is interlocked with the inner tube 11 in the optical axis direction. The cam ring 6 is connected with the zoom ring 4 via a bolt 41 radially and inwardly projecting from the zoom ring 4 so as to radially penetrate a slit 123 provided on the outer tube 12, to thereby interlockedly rotate with the zoom ring 4. The cam ring 6 is provided with an inner cam 61 formed on an inner circumferential surface thereof, with which a cam follower 32, provided on a lens frame 31 of the rear lens group 3 so as to radially penetrate a guide groove 112 provided on the inner tube 11 in the optical axis direction, is engaged so that the rotation of the cam ring 6 causes the rear lens group 3 to move in a direction along optical axis, because of the cam engagement of the inner cam 61 and the cam follower 32.

The cam ring 6 is also provided with outer cam projections 62 radially projecting from an outer circumferential surface thereof at a predetermined interval, and a moving ring 7 is fitted around the outer circumference of the cam ring 6. The moving ring 7 includes, on the inner circumferential surface thereof, a cam groove 71, and a key 72 extending in the optical axis direction, such that the cam groove 71 is held between the outer cam projections 62 of the cam ring 6, and the key 72 is fitted in a key groove 113 formed in a region on the outer circumference of a front flange portion of the inner tube 11. Accordingly, a rotation of the cam ring 6 causes the moving ring 7 to move along the optical axis direction because of the engagement of the outer cam projections 62 and the cam groove 71, while being restricted from rotating by the engagement of the key 72 and the key groove 113.

The moving ring 7 is provided with a male helicoid 73 at a rear end portion of the outer circumferential surface, in the optical axis direction. To the outer circumference of the moving ring 7, a helicoid ring 8 having a female helicoid 81 on the inner circumferential surface thereof is fitted, such that the female helicoid 81 and the male helicoid 73 are helicoidally engaged. The helicoid ring 8 includes a key 82 radially and outwardly projecting from a region on the outer circumferential surface, so that the key 82 is engaged with the key groove 52 formed in the optical axis direction over a region on the inner circumferential surface of the focus ring 5. Accordingly, a rotation of the focus ring 5 causes the helicoid ring 8 to interlockedly rotate because of the engagement of the key 82 and the key groove 52. Also, the helicoid ring 8 includes a plurality of bayonet claws 83, respectively projecting radially and inwardly from different positions on the inner circumferential surface of the front end portion, such that the bayonet claws 83 are respectively engaged with bayonet portions 22 radially and outwardly projecting from different positions on the outer circumferential surface of the lens frame 21 of the front lens group 2, thus to be interlocked with the lens frame 21 of the front lens group 2 in the optical axis direction. Here, the length of the bayonet claws 83 and the circumferential length of the bayonet portion 22 are determined such that the engagement of the bayonet claws 83 and the bayonet portions 22 is maintained when the focus ring 5 is rotated so as to rotate the helicoid ring 8. Also, as already stated, the lens frame 21 includes the key 23 radially and outwardly projecting from a position on the outer circumferential surface thereof, such that the key 23 is engaged with the key groove 111 on the inner circumferential surface of the inner tube 11. Thereby, the lens frame 21 is restricted from rotating.

Figure 4:
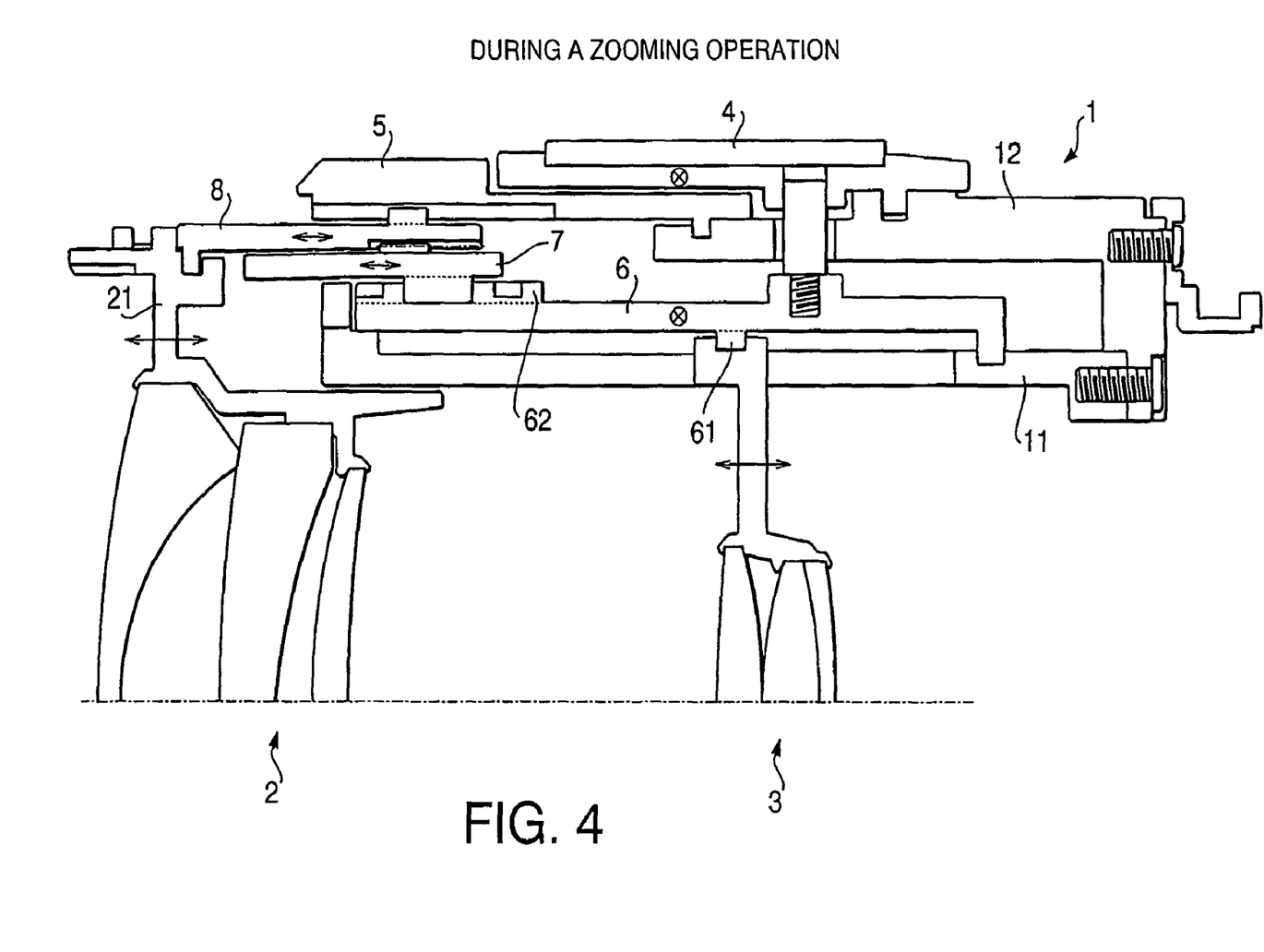
FIG. 4 is a cross-sectional view showing moving directions of the components in a zooming operation.

With the lens body tube according to this embodiment, rotating the zoom ring 4 causes the cam ring 6 to interlockedly rotate, in the zooming operation. FIG. 4 illustrates the identical portion of the lens body tube to that shown in FIG. 1, for indicating the moving direction of the respective components. In FIG. 4, a double arrow indicates a movement along the optical axis direction; a circle enclosing a cross indicates a rotation around the optical axis; and a component without any mark is immobile. A rotation of the cam ring 6 causes the rear lens group 3, which is engaged with the inner cam 61, to move along the optical axis direction. Concurrently, the moving ring 7 engaged with the outer cam projections 62 is also caused to move along the optical axis direction. The movement of the moving ring 7 is performed without being rotated because of the engagement of the key 72 and the key groove 113. Also, since the focus ring 5 is not applying a rotational force to the helicoid ring 8 screwed together with the moving ring 7, the helicoid ring 8 is caused to move along the optical axis direction, interlocked with the moving ring 7. This motion further causes the lens frame 21 of the front lens group 2, bayonet-engaged with the helicoid ring 8, to move along the optical axis direction, thus causing the front lens group 2 to move along the optical axis direction. In this way, both the front lens group 2 and the rear lens group 3 are moved to a desired position along the optical axis direction at a time, thus to complete the zooming operation. During such operation, since the lens frame 21 of the front lens group 2 is restricted from rotating by the key engagement with the inner tube 11, accessories such as a filter and a hood (not shown) attached to the lens frame 21 of the front lens group 2 are kept from being rotated.

Figure 5:
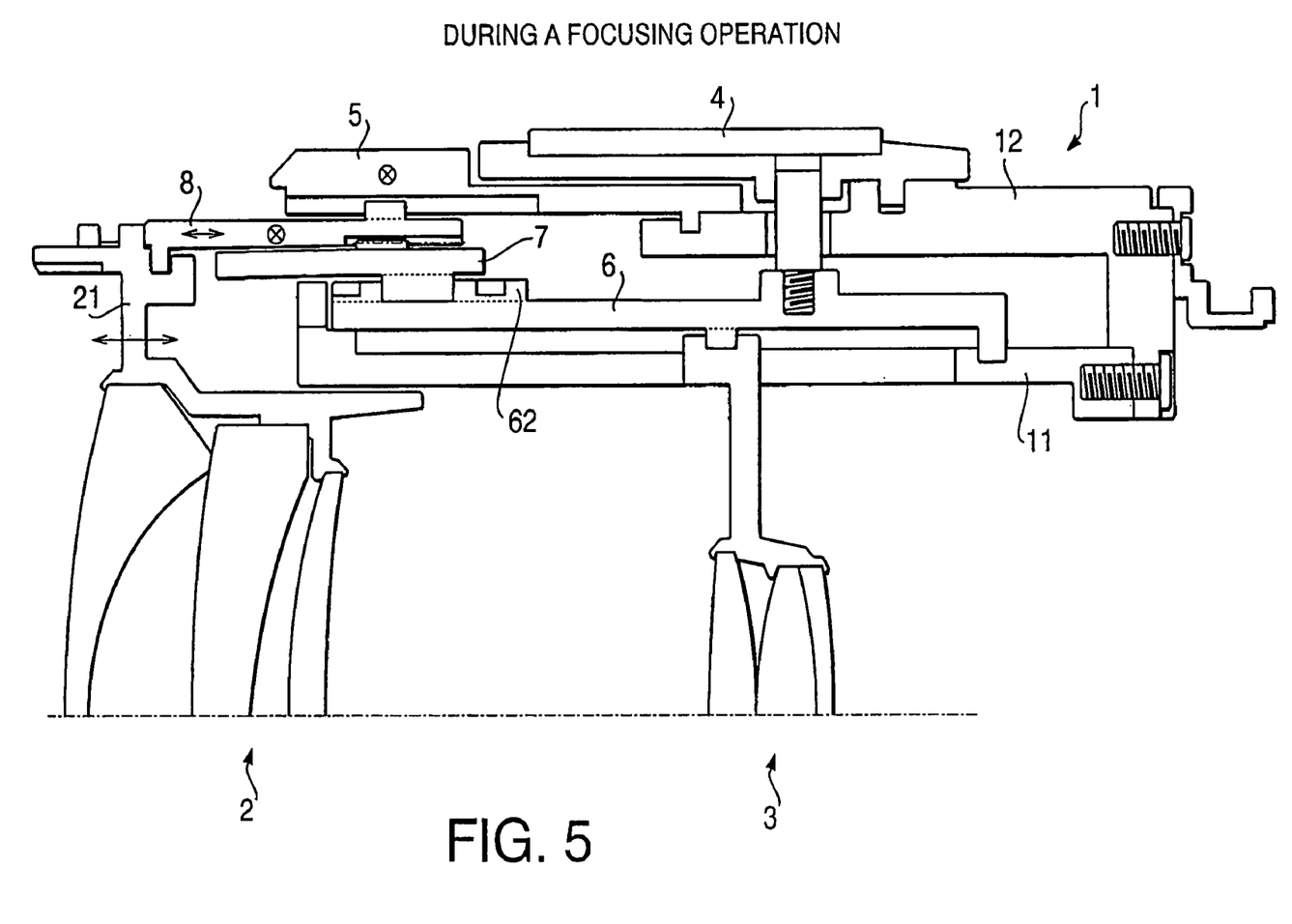
FIG. 5 is a cross-sectional view showing moving directions of the components in a focusing operation.

In the focusing operation, rotating the focus ring 5 causes the helicoid ring 8 to interlockedly rotate. FIG. 5 illustrates the identical portion of the lens body tube to that shown in FIG. 1, for indicating the moving direction of the respective components with the same marks as those used in FIG. 4. When the helicoid ring 8 rotates, the moving ring 7 is kept from rotating by the engagement of the key 72 and the key groove 113, and also from moving along the optical axis direction because of the engagement with the outer cam projections 62 which is immobile at this stage, since the cam ring 6 is not rotated. Accordingly, the rotation of the focus ring 5 only causes the helicoid ring 8 to spirally move along the optical axis direction, because of the helicoidal engagement with the moving ring 7. This in turn causes the lens frame 21 bayonet-engaged with the helicoid ring 8, and hence the front lens group 2 to move along the optical axis direction, thus achieving a desired focusing effect. During such focusing operation also, since the lens group 2 is restricted from rotating by the key engagement, the accessories attached to the lens frame 21 are kept from being rotated. Further, although the helicoid ring 8 alone is rotated while the lens frame 21 remains immobile, the helicoid ring 8 and the lens frame 21 do not get disengaged since sufficient circumferential lengths of the bayonet claws 83 and the bayonet portion 22 are secured.

Thus, the lens body tube according to the embodiment allows moving both the front lens group 2 and the rear lens group 3 along the optical axis direction in the zooming operation, and moving only the front lens group 2 along the optical axis direction in the focusing operation. In either of the cases, the front lens group 2 is kept from rotating. Also, it is only the moving ring 7 and the helicoid ring 8 that have to be radially stacked between the cam ring 6, fitted around the outer circumference of the inner tube 11 serving to move the front lens group 2 along the optical axis direction, and the focus ring 5 fitted around the outer tube 12. Accordingly, it is no longer necessary to employ the sleeve portion 24 of the lens frame 21 in the conventional structure shown in FIG. 6, in addition to those rings. Consequently, the lens body tube according to the embodiment permits reducing the number of ring-shaped components to be radially stacked on the cam ring 6, thus reducing the diameter of the lens body tube.

Further, in the lens body tube according to the embodiment, the helicoid ring 8 is bayonet-engaged with the lens frame 21 of the front lens group 2, which makes it easier to assemble the front lens group 2 in the main tube 1. More specifically, once the rear lens group 3 has been installed in the main tube 1, the rest of the assembly can be performed simply by attaching the cam ring 6, the moving ring 7, the helicoid ring 8, the focus ring 5 and the zoom ring 4 one after another, and finally mounting the front lens group 2 on the helicoid ring 8. In contrast, when assembling the conventional lens body tube shown in FIG. 6, the front lens group 2 has to be helicoidally engaged in advance with the helicoid ring 8A, prior to mounting the moving ring 7A and the helicoid ring 8A on the main tube 1, which is much more complicated.

The structure of a lens body tube according to the present invention is not exclusively intended for the lens body tube including two lens groups as the foregoing embodiment, but is vastly applicable to such lens body tubes that include a plurality of lenses or lens groups driven by a cam ring for zooming, wherein a part of the lenses including a front lens group is driven for focusing.

The present disclosure relates to the subject matter contained in Japanese Patent Application No. P2004-331351, filed on Nov. 16, 2004, which is expressly incorporated herein by reference in its entirely.

What is claimed is:

1. A lens body tube comprising:
a main tube;
at least one lens configured movable along the optical axis direction of the lens body tube in the main tube;
a first ring configured to be rotated for a zooming operation, the first ring being disposed around the outer circumference of the main tube;
a second ring configured to be rotated for a focusing operation, the second ring being disposed around the outer circumference of the main tube;
a third ring configured to be rotated by the first ring, the third ring being disposed inside the main tube;
a fourth ring configured to be translated along the optical axis direction by rotation of the third ring, the fourth ring being disposed inside the main tube;
a fifth ring configured to be rotated by the second ring; and
at least one lens frame, of the at least one lens, supported by the fifth ring,
wherein the fifth ring is screwed together with the fourth ring.

2. The lens body tube according to claim 1,
wherein the main tube includes an inner tube and an outer tube,
wherein the third ring is disposed around the outer circumference of the inner tube,
wherein the first ring and the second ring are disposed around the outer circumference of the outer tube, and
wherein the fourth ring and the fifth ring are radially stacked between the second and third rings.

3. The lens body tube according to claim 1,
wherein the at least one lens is restricted from rotating around the optical axis.

4. The lens body tube according to claim 3,
wherein the lens body tube further includes a plurality of lenses, and
wherein the at least one lens is included in a front lens group, in the optical axis direction, among the plurality of lenses.

5. The lens body tube according to claim 1,
wherein the third ring is formed with at least one outer cam on the outer circumferential surface thereof, and
wherein the fourth ring is engaged with the at least one outer cam.

6. The lens body tube according to claim 1,
wherein the at least one lens frame and the fifth ring are configured engaged with each other through a bayonet mechanism, so as to relatively rotate with respect to each other, but to be mutually interlocked in the optical axis direction.

7. The lens body tube according to claim 2,
wherein the at least one lens is restricted from rotating around the optical axis.

8. The lens body tube according to claim 7,
wherein the lens body tube further includes a plurality of lenses, and
wherein the at least one lens is included in a front lens group, in the optical axis direction, among the plurality of lenses.

9. The lens body tube according to claim 2,
wherein the third ring is formed with at least one outer cam on the outer circumferential surface thereof, and
wherein the fourth ring is engaged with the at least one outer cam.

10. The lens body tube according to claim 2,
wherein the at least one lens frame and the fifth ring are configured engaged with each other through a bayonet mechanism, so as to relatively rotate with respect to each other, but to be mutually interlocked in the optical axis direction.

11. The lens body tube according to claim 3,
wherein the third ring is formed with at least one outer cam on the outer circumferential surface thereof, and
wherein the fourth ring is engaged with the at least one outer cam.

12. The lens body tube according to claim 3,
wherein the at least one lens frame and the fifth ring are configured engaged with each other through a bayonet mechanism, so as to relatively rotate with respect to each other, but to be mutually interlocked in the optical axis direction.

13. The lens body tube according to claim 5,
wherein the at least one lens frame and the fifth ring are configured engaged with each other through a bayonet mechanism, so as to relatively rotate with respect to each other, but to be mutually interlocked in the optical axis direction.

14. The lens body tube according to claim 7,
wherein the third ring is formed with at least one outer cam on the outer circumferential surface thereof, and
wherein the fourth ring is engaged with the at least one outer cam.

15. The lens body tube according to claim 7,
wherein the at least one lens frame and the fifth ring are configured engaged with each other through a bayonet mechanism, so as to relatively rotate with respect to each other, but to be mutually interlocked in the optical axis direction.

16. The lens body tube according to claim 8,
wherein the third ring is formed with at least one outer cam on the outer circumferential surface thereof, and
wherein the fourth ring is engaged with the at least one outer cam.

17. The lens body tube according to claim 8,
wherein the at least one lens frame and the fifth ring are configured engaged with each other through a bayonet mechanism, so as to relatively rotate with respect to each other, but to be mutually interlocked in the optical axis direction.

18. A lens body tube comprising:
a main tube;
at least one lens configured movable along the optical axis direction of the lens body tube in the main tube;
a first ring configured to be rotated for a zooming operation, the first ring being disposed around the outer circumference of the main tube;
a second ring configured to be rotated for a focusing operation, the second ring being disposed around the outer circumference of the main tube;
a third ring configured to be rotated by the first ring, the third ring being disposed inside the main tube;
a fourth ring configured to be translated along the optical axis direction by rotation of the third ring, the fourth ring being disposed inside the main tube;
a fifth ring configured to be rotated by the second ring; and at least one lens frame, of the at least one lens, supported by the fifth ring, wherein the fifth ring is screwed together with the fourth ring, wherein the main tube includes an inner tube and an outer tube, wherein the third ring is disposed around the outer circumference of the inner tube, wherein the first ring and the second ring are disposed around the outer circumference of the outer tube, wherein the fourth ring and the fifth ring are radially stacked between the second and third rings, wherein the at least one lens is restricted from rotating around the optical axis, wherein the lens body tube further includes a plurality of lenses, wherein the at least one lens is included in a front lens group, in the optical axis direction, among the plurality of lenses, wherein the third ring is formed with at least one outer cam on the outer circumferential surface thereof, wherein the fourth ring is engaged with the at least one outer cam, and wherein the at least one lens frame and the fifth ring are configured engaged with each other through a bayonet mechanism, so as to relatively rotate with respect to each other, but to be mutually interlocked in the optical axis direction.

* * * * *